Figure 1:
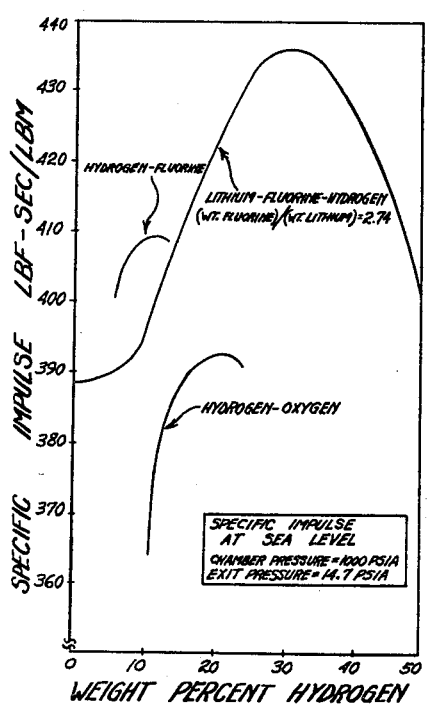

Dec. 3, 1963     R. M. BRIDGFORTH, JR     3,112,608
TRIPLEX PROPULSION SYSTEM AND METHOD
Filed Nov. 3, 1960

INVENTOR.
ROBERT M. BRIDGFORTH, JR.
BY Mathis and Graybeal
ATTORNEYS 3,112,608
Patented Dec. 3, 1963

3,112,608
TRIPLEX PROPULSION SYSTEM AND METHOD
Robert M. Bridgforth, Jr., Mercer Island, Wash., assignor to Rocket Research Corp., Seattle, Wash., a corporation of Washington
Filed Nov. 3, 1960, Ser. No. 67,017
7 Claims. (Cl. 60—35.4)

This invention relates to a propulsion system for rockets and, more specifically, to such a propulsion system and process characterized by a fuel-oxidizer reaction and the admixture with the reaction products of a very low molecular weight working fluid to condense the reaction products essentially solely by physical admixture therewith to increase the available heat from the reaction, and to decrease the average molecular weight as well as increase the velocity of the thrust developing reaction stream. In particular, an embodiment of such a system can employ a lithium or lithium containing fuel component, fluorine as the oxidizing component, and hydrogen as the working fluid, which constituents provide what may be termed a triplex propellant.

The unit of measure of the power of a propellant reaction is the specific impulse, defined as the thrust of the rocket engine divided by the flow rate of the propellant. Until the present time, it has been the opinion of those concerned with rocket propellants that the system hydrogen-fluorine gave the highest specific impulse of any stable chemical rocket propellant. This invention discloses a stable chemical rocket propellant with specific impulse substantially greater than that of the hydrogen-fluorine system.

Previously, in the selection of rocket propellants, attention has been directed toward those substances which, when reacted together, produce high temperature exhaust gases. These gases, the reaction products of the fuel and the oxidizer, are then expanded through a nozzle to leave the rocket at high velocity and exert a thrust upon the rocket.

In my invention the functions of producing heat and of converting thermal energy to kinetic energy are considered separately. Two classes of chemicals are used. One class is called the reactants, and these chemicals involve a fuel-oxidizer pair, selected primarily for their ability to produce large quantities of heat per unit mass. For purposes of the present invention, lithium has been found to be the best fuel component and fluorine the best oxidizer component. The second class is called the working fluid, and is selected primarily for the ability to receive the heat produced by the reactant and to convert this thermal energy into kinetic energy. For purposes of the present invention, hydrogen has been found to be the most effective working fluid.

In particular, the reaction system of the present invention comprises a triplex system involving lithium-fluorine-hydrogen, which components in their intermixture, chemical reaction, and thermal interaction as a rocket propellant in a rocket engine produce a higher specific impulse than either a hydrogen-fluorine system, or a lithium fluorine system. As indicated, lithium and fluorine are employed as the reactants, and hydrogen is employed as the working fluid. When lithium reacts with fluorine, lithium fluoride is formed. This substance has a normal boiling point of 2,080° K. The standard heat of reaction of lithium with fluorine is 5,385 B.t.u./lb. if the lithium fluoride reaction product is in the vapor state. However, if the lithium fluoride reaction product is transformed to a liquid or solid state, the standard heats of reaction are respectively 9,856 B.t.u./lb. or 10,150 B.t.u./lb. The addition of the working fluid hydrogen, according to the present invention, results in the lithium fluoride being cooled and in large part condensed in the course of the reaction and discharge of the reaction stream, giving a substantially higher heat of reaction (i.e. available heat), and providing a gaseous phase primarily constituted by low molecular weight hydrogen (M.W. 2) rather than the high molecular weight lithium fluoride (M.W. 25.9).

In its broader aspects, the present invention comprehends utilization of an essentially non-reacted, very low molecular weight working fluid with a reaction product which is normally gaseous in the absence of a working fluid but which is condensable at a relatively high temperature, i.e. condensable at an elevated temperature compatible with customary, art-recognized reaction engine exhaust gas temperature requirements.

If no working fluid is mixed with the lithium-fluoride reaction, the reaction chamber temperature is about 5,570° K., and the temperature of the discharge stream emerging from the nozzle is about 3,640° K., assuming a stoichiometric reaction and operating conditions as defined with respect to accompanying FIG. 1. It is important to note with respect to such operation without a working fluid that the temperature of the discharge stream at the exit plane is substantially higher than the normal boiling point of lithium fluoride, 2,080° K., so that the lithium fluoride reaction product remains in the vapor state until well past the exit plane of the discharge nozzle. However, if a working fluid, such as hydrogen in the amount of 20% for example, is injected into the reaction chamber, under the same conditions, the temperature in the reaction chamber is reduced to about 2,720° K., and the temperature of the discharging stream at the exit plane is about 1,640° K., which is well below the normal boiling point of LiF (2,080° K.), and which results in a predominant part of the reaction product being in non-gaseous phase at the exit plane. In actuality not all of the reatcion product is condensed in any event because of the existence of partial pressure equilibria. Manifestly, the extent of cooling incurred by the working fluid can be varied as desired to achieve a particular manner of operation, depending upon the relative proportion of working fluid introduced to the reaction. The important consideration is that sufficient working fluid be added to the reaction to accomplish an exhaust temperature below about 2,080° K. at the exit plane, i.e. to accomplish condensation of the expanding discharge stream of a large part of the condensable reaction product.

Although hydrogen may possibly enter into chemical combination with fluorine to a small extent in the combustion chamber, at the temperatures existing in the exhaust flame there is no appreciable stable reaction between hydrogen and lithium fluoride, and the principal chemical species present in the exhausting products are gaseous hydrogen and condensed lithium fluoride, in either liquid or solid form. The high heat of formation of lithium fluoride, coupled with the low molecular weight of hydrogen, results in a system having a very high specific impulse.

The mode by which this invention operates can be explained by referring to the equation for specific impulse. When the exit pressure equals ambient pressure, the specific impulse of a propulsion reaction is given by the following equation:

$$I_s = \sqrt{\frac{2J}{g} C_p T_c \left[1 - \left(\frac{P_e}{P_c}\right)^{R'/\beta M C_{pJ}}\right]}$$

where
$I_s$ = specific impulse in lb. f.-sec./lb. m.
$J$ = 788 ft.-lb. f./B.t.u.
$g$ = 32.2 lb. m./slug
$C_p$ = mean specific heat
$T_c$ = combustion chamber temperature in ° R.
$P_c$ = combustion chamber pressure $Pe$ = exit pressure
$R'$ = gas constant $$\beta = 1 + \frac{\text{mass flow rate of condensed phase}}{\text{mass flow rate of gas phase}}$$

$M$ = mean molecular weight of gases.

Since
$$CpTc = CpTo + (1-Z)Qc$$
where
$To$ = temperature of reactance and working fluid before reaction in °R., and
$Qc$ = heat of reaction of the reactants in B.t.u./lb. m., without considering the working fluid.

$$Z = \frac{\text{mass flow rate of working fluid added to reactants}}{\text{total mass flow rate through rocket}}$$

and since $To$ is much less than $Tc$, the above equation for specific impulse becomes, approximately, $$I_s \cong \frac{2J}{g}(1-Z)Qc\left[1-\left(\frac{Pe}{Pc}\right)^{R'/J\beta MCp}\right]$$

By examining the above equation, the effect of adding hydrogen as a working fluid to a lithium-fluorine reactant system can be seen. As the hydrogen content increases the following effects occur:

(1) The factor $(1-Z)$ decreases, tending to decrease the specific impulse.

(2) More and more lithium fluoride is condensed and the high heat of condensation of lithium fluoride thus causes $Qc$ to increase, tending to increase specific impulse.

(3) As lithium fluoride condenses, $\beta$ increases, tending to decrease specific impulse until eventually essentially all of the lithium fluoride is condensed, and adding more hydrogen will again decrease $\beta$.

(4) The addition of low molecular weight hydrogen causes the mean molecular weight $M$ of the gas to decrease and condensation of the lithium fluoride removes it from the gas phase and eventually $M$ decreases to approximately 2.016, with the effect of increasing specific impulse.

(5) Due to the high specific heat of hydrogen, the mean specific heat $Cp$ increases, tending to decrease specific impulse.

The composite result of all these effects is that as hydrogen is added to lithium-fluorine, the specific impulse first increases, and then decreases when the hydrogen content is increased above about 30% by weight.

The specific impulse values of the system lithium-fluorine-hydrogen, with no losses and with shifting equilibria, are shown in the following Table I:

*Table I*

[Specific impulse at sea level—Lithium-fluorine-hydrogen. Chamber pressure=1000 p.s.i.a.; exit pressure=14.7 p.s.i.a.]

| (Wt. Fluorine)/(Wt. Lithium) | Wt. Percent Hydrogen | Specific Impulse lb. f.-sec./lb. m. |
| --- | --- | --- |
| 2.74 (stoichiometric) | 0 | 389 |
| 2.74 | 10 | 396 |
| 2.74 | 15 | 409 |
| 2.74 | 20 | 422 |
| 2.74 | 25 | 432 |
| 2.74 | 30 | 436 |
| 2.74 | 35 | 434 |
| 2.74 | 40 | 426 |
| 2.74 | 50 | 401 |
| 2.00 | 0 | 392 |
| 2.00 | 20 | 398 |
| 2.00 | 30 | 412 |
| 2.00 | 50 | 374 |
| 30.0 | 0 | 163 |
| 30.0 | 10 | 407 |
| 30.0 | 30 | 392 |
| 30.0 | 50 | 355 |

In the following Table II, the vacuum specific impulse is shown, defining the performance of the propellant in the environment of outer space:

*Table II*

[Vacuum specific impulse—Lithium-flourine-hydrogen. Chamber pressure—1000 p.s.i.a.; (wt. fluorine)/(wt. lithium)—2.74. Hydrogen concentration selected for maximum specific impulse]

| Exhaust Nozzle Area Ratio | Vacuum specific impulse, lb. f.-sec./lb. m. |
| --- | --- |
| 20 | 499 |
| 50 | 520 |
| 100 | 534 |
| 500 | 562 |
| ∞ | 708 |

The following Table III shows the gains in specific impulse which the lithium-fluorine-hydrogen system produces over the hydrogen-oxygen system and the hydrogen-fluorine system:

*Table III.—Lithium-Fluorine-Hydrogen*

[Specific impulse expressed in lb. f.-sec./lb.m. Hydrogen concentration selected for maximum specific impulse]

| Condition | Increase in specific impulse over hydrogen-oxygen | Increase in specific impulse over hydrogen-fluorine |
| --- | --- | --- |
| Sea Level; Exit pressure 14.7 p.s.i.a. | 42 | 27 |
| Vacuum; Nozzle area ratio=50 | 59 | 40 |
| Vacuum; Nozzle area ratio=100 | 62 | 45 |
| Vacuum; Nozzle area ratio=500 | 74 | 56 |
| Vacuum; Nozzle area ratio=∞ | 138 | 171 |

The maximum sea level specific impulse is obtained with the following composition:

Wt. percent hydrogen = 30
(Wt. fluorine)/(wt. hydrogen) = 2.74

As shown in Table 1, this propellant composition gives a sea-level specific impulse of 436 lb. f.-sec./lb. m., which is 27 lb. f.-sec./lb. m. greater than that of hydrogen-fluorine, the previously supposed most powerful stable chemical propellant, having under the same conditions a specific impulse of 409 lb. f.-sec./lb. m. It is also to be noted that the sea-level specific impulse of the lithium-fluorine-hydrogen system is 42 lb. f.-sec./lb. m. greater than that of the system hydrogen-oxygen, a currently popular high energy propellant which has under the same conditions a specific impulse of 394 lb. f.-sec./lb. m. With large area ratio exhaust nozzles, the gains in vacuum specific impulse over conventional systems become greater, approaching up to 138 lb. f.-sec./lb. m. over hydrogen-oxygen and approaching up to 171 lb. f.-sec./lb. m. over hydrogen-fluorine as the exhaust nozzle area ratio becomes indefinitely larger. As the exhaust nozzle area ratio becomes larger, the composition which produces maximum vacuum specific impulse corresponds to a stoichiometric ratio of fluorine to lithium, (wt. fluorine)/(wt. lithium) = 2.74, but the concentration of hydrogen for maximum vacuum specific impulse varies from a weight percent of 30 at a nozzle area ratio of 30 to a weight percent of 20 at a nozzle area ratio of 10,000 to a weight percent of zero at an infinite area ratio.

Figure 2:
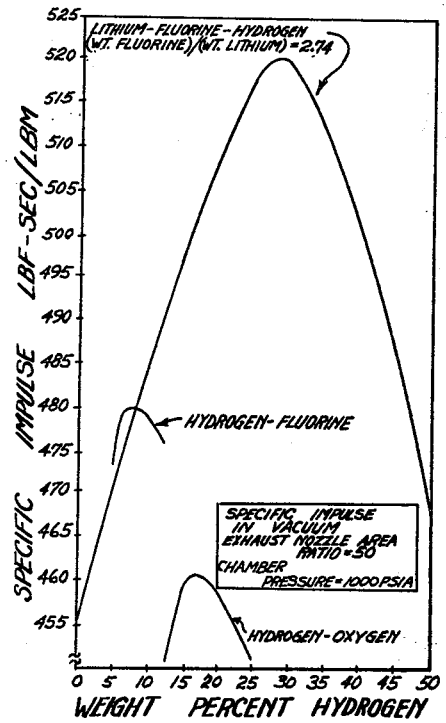
Figure 3:
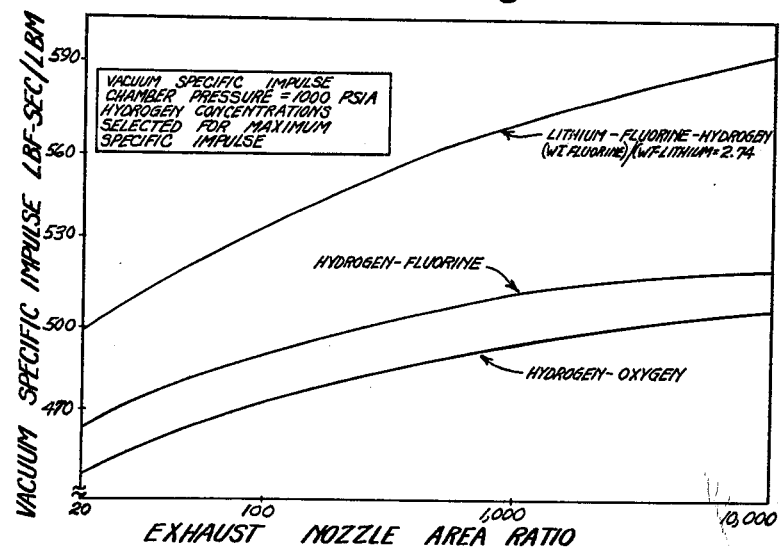

For purposes of ready comparison, and to show the substantially improved performance characteristics of the tri-propellant system here presented, accompanying FIG. 1 graphically shows the variations of sea-level specific impulses of hydrogen-fluorine and hydrogen-oxygen systems as well as the lithium-fluorine-hydrogen system of the present invention, assuming a reaction chamber pressure of 1000 p.s.i.a. and an atmospheric exit pressure; FIG. 2 shows a corresponding comparison of the vacuum specific impulses of the three systems under a typical exhaust nozzle area ratio of 50; and FIG. 3 similarly compares the maximum vacuum specific impulses of the three systems at various exhaust nozzle ratios.

It is seen from the above tabulated and graphical data that, in the lithium-fluorine-hydrogen propellant system, the relative proportions of the system components are relatively critical for optimum performance and that only combinations within certain ranges are capable of producing specific impulses which are sufficiently great to represent a significant improvement over previous propellant systems.

When the hydrogen content is below about 10% by weight, the system reduces essentially to a lithium-fluorine system, and the gain in specific impulse over that system is insufficient to warrant the complexity of adding the equipment required to handle a third component. Accordingly, the hydrogen content should preferably be between about 20% and about 40% by weight. When the hydrogen content is raised above about 50% by weight, the over-all propellant density becomes relatively low, requiring heavy tankage, and because of the large diluting effect of the hydrogen, the specific impulse decreases below that of a hydrogen-oxygen system.

For stoichiometric reaction between lithium and fluorine to form lithium fluoride, the ratio (wt. fluorine)/(wt. lithium) should be about 2.74. When excess lithium is added to the system, reducing the fluorine to lithium ratio below 2.74, the excess lithium is essentially chemically inert in this environment, and the excess serves to reduce the heat of reaction per unit mass of propellant, reducing the specific impulse. In addition, the heat of vaporization of lithium is very high, being 32.48 K. cal./mole, and this contributes to additional degradation in performance. Finally, lithium vapor, with an atomic weight of 6.94, is added to the gas phase, increasing the average molecular weight of the gas and tending to reduce performance.

The addition of excess fluorine, above the stoichiometric ratio, produces appreciable quantities of hydrogen fluoride, which is entirely gaseous, reducing the weight percent of the condensed phase, and increasing the over-all propellant density, but reducing the over-all heat of reaction. With a very large fluorine content, the system approaches the hydrogen-fluorine system, and the presence of small amounts of lithium is unjustified because of the small performance gain produced and the increase in complexity required to introduce a third component. Therefore, the ratio (wt. fluorine)/(wt. lithium) should usually be close to 2.74, and the entire working range runs from about 2.00 to about 30.0.

The optimum constituency of the propellant of the present invention depends upon the specific mission which the rocket system is to perform, and does not always exactly correspond to the composition giving maximum specific impulse. Tank weights must be considered, in a study of the particular mission and the propellant requirements. For some missions, a composition which has a greater over-all propellant density may have lower tank weights and may give better over-all vehicle performance than given by the exact constituency having maximum specific impulse. The optimum propellant composition, with the optimum compromise between high specific impulse and high propellant density, therefore depends upon the specific mission.

This propellant system is intended to be utilized in a rocket engine by techniques generally known per se in rocket technology. Storage chambers are provided for the propellants, which are suitably transported from the storage chambers to the reaction chamber. Here, mixing and chemical reaction take place, the lithium reacting with the fluorine to form lithium fluoride, and releasing large quantities of heat. To a lesser degree, the hydrogen reacts with the fluorine to form hydrogen fluoride, but the principal function of the hydrogen is to mix with the lithium fluoride, to receive its heat, and to expand through a converging-diverging nozzle, carrying along the condensed lithium fluoride, and leaving the rocket at high velocity, exerting a thrust on the rocket.

The hydrogen and the fluorine can be carried in propellant tanks as liquids, using the technology of handling cryogenic fluids which is now well developed by the rocket industry. In regard to the lithium, this fuel may be supplied as a solid or as a liquid. Lithium has a melting point of 186° C., and can be melted in the pre-launch operations or during flight. In regard to its utilization in solid form, the lithium may be powdered and introduced into the reaction chamber as a powder, or it may be introduced in the form of wire. Alternately, the lithium may be carried in the reaction chamber in suitable solid form, such as a chamber liner, and can constituently be either substantially pure or containing relatively small quantities of lithium hydride, lithium perchlorate, or ammonium perchlorate, for example.

The lithium, fluorine, and hydrogen may be injected, exposed or otherwise introduced to the reaction in the chamber at essentially the uniform rates and in such a manner as to obtain the most rapid mixing of all three. A modification of this method of injection consists in designing the injector so that the lithium and the fluorine are mixed first, and the resulting lithium fluoride is then mixed with hydrogen, which has been injected around the walls at the primary injector station or which has been injected downstream of the primary injector station.

In another utilization layout for the system, a portion of the hydrogen is carried in the form of lithium hydride by having a portion or all of the lithium in the form of lithium hydride. In the following Table IV and Table V, it is seen that the specific impulse of the lithium hydride-fluorine-hydrogen system is not as great as the lithium-fluorine-hydrogen system. However, the over-all density of the propellants is increased and under some circumstances it may be practicably desirable to have a system comprising lithium hydride, fluorine, and hydrogen.

*Table IV*

[Specific impulse at sea-level—Lithium hydride-fluorine-hydrogen. Chamber pressure=1000 p.s.i.a.; exit pressure=14.7 p.s.i.a.; (wt. fluorine)/(wt. lithium)=2.74]

| Wt. percent uncombined hydrogen | Specific impulse, lb. f.-sec./lb. m. |
|---|---|
| 0 | 362 |
| 11.7 | 376 |
| 16.9 | 386 |
| 22.1 | 395 |
| 27.2 | 400 |
| 32.4 | 398 |

*Table V*

Vacuum specific impulse—Lithium hydride-fluorine-hydrogen. Chamber pressure=1000 p.s.i.a.; (wt. fluorine)/(wt. lithium)=2.74. Hydrogen concentration selected for maximum specific impulse]

| Exhaust Nozzle Area Ratio | Vacuum Specific Impulse, lb. f.-sec./lb. m. |
|---|---|
| 50 | 480 |
| 100 | 494 |
| ∞ | 636 |

In the following Table VI there is presented data with respect to the approximate temperature in the reaction chamber for the three systems hydrogen-fluorine, hydrogen-oxygen, and lithium-fluorine-hydrogen, all such systems being compared at proportions given maximum specific impulse at sea-level. From a construction standpoint and a material-usage standpoint, the lower the temperature of combustion the longer the life of the materials of construction and, also, the lighter the weight of the materials of construction that can be used. Therefore, it is seen that the lithium-fluorine-hydrogen system is superior to the other two systems in Table VI.

Table VI

| Propellant | Temperature in reaction chamber, ° F. |
|---|---|
| Hydrogen-fluorine | 6500 |
| Hydrogen-oxygen | 4930 |
| Lithium-fluorine-hydrogen | 3530 |

The specific impulse values reported in this specification are based upon the propellants in the following initial states: liquid hydrogen at its normal boiling point of 20° K.; liquid fluorine at its normal boiling point of 85° K.; liquid lithium at 500° K.; and solid lithium hydride at 300° K.

From the foregoing specification it is seen that there is represented a lithium-fluorine-hydrogen rocket propulsion system, which tripropellant system is characterized essentially by a chemical reaction between the lithium and fluorine releasing heat, and with hydrogen acting to condense the lithium fluoride and increase the heat released from the lithium fluoride, and with the hydrogen acting as a low molecular weight gas to efficiently convert thermal energy into kinetic energy, producing a high specific impulse.

From the foregoing considerations, various further modifications, formulations, and utilization techniques characteristic of the invention will be apparent to those skilled in the art, within the scope of the following claims.

What is claimed is:

1. A method of generating thrust in a rocket engine; said method comprising mixing lithium, fluorine and essentially uncombined hydrogen in a reaction chamber, and discharging the lithium fluoride reaction product and admixed hydrogen through an exhaust nozzle at high velocity, producing thrust; the weight ratio of fluorine to lithium lying between about 2 and about 30; and the weight percent of the hydrogen in the total mixture being between about 10 percent and about 50 percent.

2. A method of generating thrust in a rocket engine; said method comprising mixing lithium, fluorine and essentially uncombined hydrogen in a reaction chamber, and discharging the lithium fluoride reaction product and admixed hydrogen through an exhaust nozzle at high velocity, producing thrust; the weight ratio of fluorine to lithium being approximately 2.74, and the weight percent of the hydrogen in the total mixture being between about 20 percent and about 40 percent.

3. A method for generating thrust in a rocket engine; said method comprising mixing lithium hydride, lithium, fluorine and essentially uncombined hydrogen in a reaction chamber and discharging the lithium fluoride reaction product and admixed hydrogen through an exhaust nozzle at high velocity, producing thrust; the weight ratio of fluorine to total lithium being approximately 2.74, and the weight percent of the hydrogen in the total mixture being between about 15 percent and about 30 percent.

4. A propellant composition comprising lithium fluoride and essentially uncombined hydrogen; the weight ratio of fluorine to lithium lying between about 2 and about 30; and the weight percent of the hydrogen in the mixture being between about 20 percent and about 50 percent of the total weight of the composition.

5. A propellant composition consisting essentially of lithium fluoride and uncombined hydrogen, the weight percent of the hydrogen in the total mixture being between about 20 percent and about 40 percent.

6. A propellant composition comprising lithium hydride, lithium, fluorine, and essentially uncombined hydrogen; the weight ratio of fluorine to total lithium being approximately 2.74, and the weight percent of the uncombined hydrogen in the total mixture being between about 15 percent and about 30 percent.

7. A composition of matter consisting essentially of at least principally non-gaseous lithium fluoride in admixture with essentially uncombined hydrogen, the weight percent of the hydrogen in the total mixture being between about 20 percent and about 50 percent.

References Cited in the file of this patent

UNITED STATES PATENTS

| 2,811,431 | Zwicky et al. | Oct. 29, 1957 |
| 2,956,402 | Rae | Oct. 18, 1960 |
| 3,034,937 | McGrew | May 15, 1962 |

OTHER REFERENCES

Leonard: Journal of the American Rocket Society, No. 72, December 1947, pp. 10–23.